United States Patent
Maynard

[15] 3,668,493
[45] June 6, 1972

[54] DYNAMOELECTRIC CONTROL CIRCUIT

[72] Inventor: John T. Maynard, New Berlin, Wis.
[73] Assignee: A. O. Smith Corporation, Milwaukee, Wis.
[22] Filed: May 20, 1970
[21] Appl. No.: 39,019

[52] U.S. Cl..............................................318/345, 321/5
[51] Int. Cl. ...........................................................H02p 5/16
[58] Field of Search ..................318/331, 345; 321/40, 47, 5

[56] References Cited

UNITED STATES PATENTS

| | | | |
|---|---|---|---|
| 3,386,025 | 5/1968 | Grillo | 321/5 |
| 3,345,549 | 10/1967 | Hauser | 318/345 |
| 3,497,786 | 2/1970 | Lombardo | 318/331 |
| 2,845,589 | 7/1958 | Osgood | 318/345 |
| 2,494,340 | 1/1950 | Leigh | 318/345 |
| 2,445,789 | 7/1948 | Lobosco | 318/345 |

Primary Examiner—Bernard A. Gilheany
Assistant Examiner—Thomas Langer
Attorney—Andrus, Sceales, Starke & Sawall

[57] ABSTRACT

A D.C. shunt motor has the armature connected to a three-phase supply through a pair of parallel connected full-wave rectifier bridges, each having silicon controlled rectifiers in each leg. A separate NOR logic circuit controls gating of each rectifier in accordance with the proper half cycle of the applied voltage and at the desired phase angle to establish a predetermined energization level. The firing is determined by an intercept detector having a separate channel for each phase. Each channel is connected through a lag filter and a lead filter directly to the corresponding phase winding of a reference transformer to supply to the channel a voltage directly derived from the line-to-line voltage applied to the corresponding rectifier. The input to each channel is connected across a center tapped reference transformer winding and the junction of a resistor and capacitor connected across the winding. A D.C. control voltage is applied to the channels to establish a control signal pulse at the proper phase angle of the rectifier-applied voltage.

8 Claims, 3 Drawing Figures

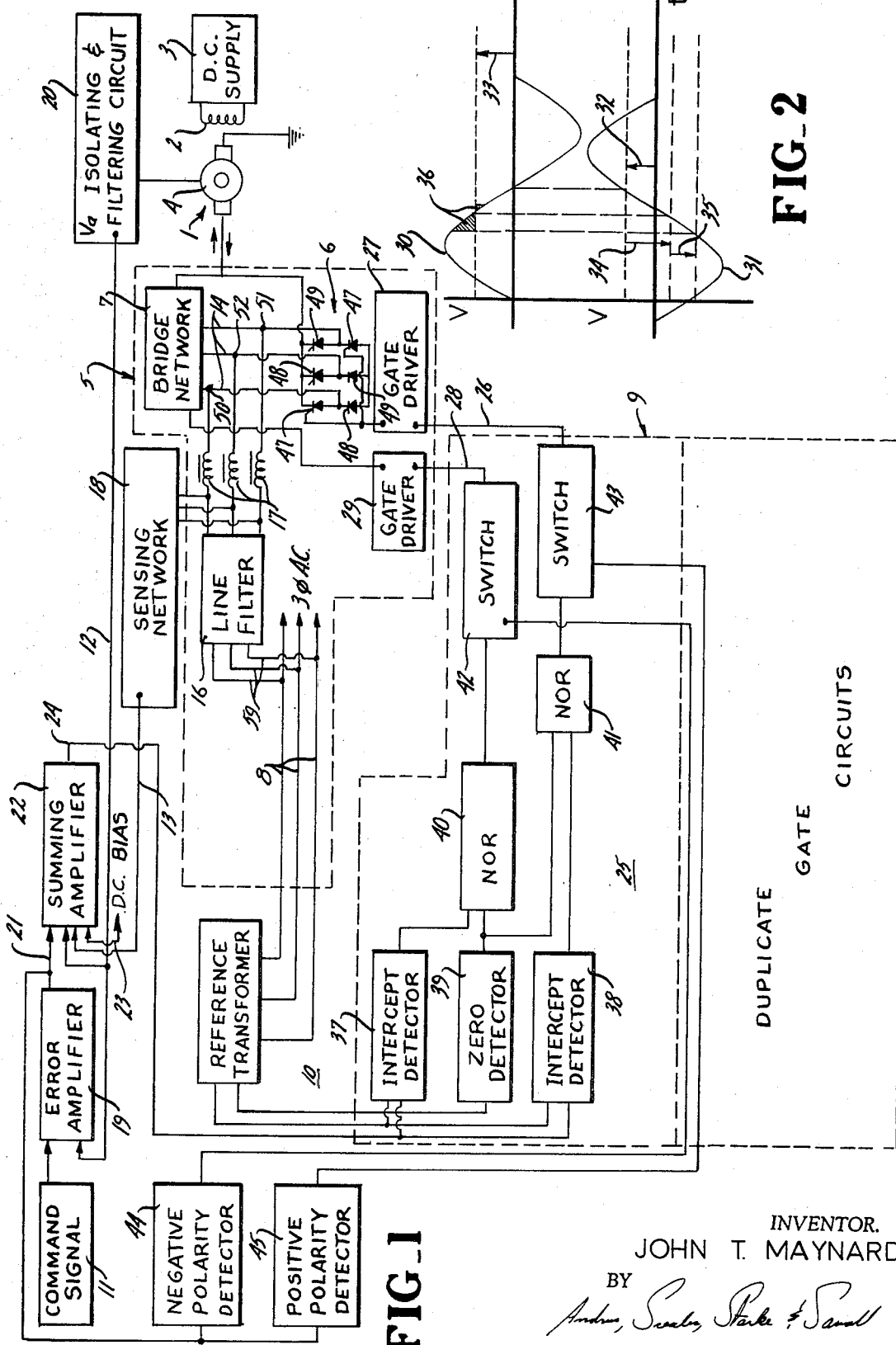

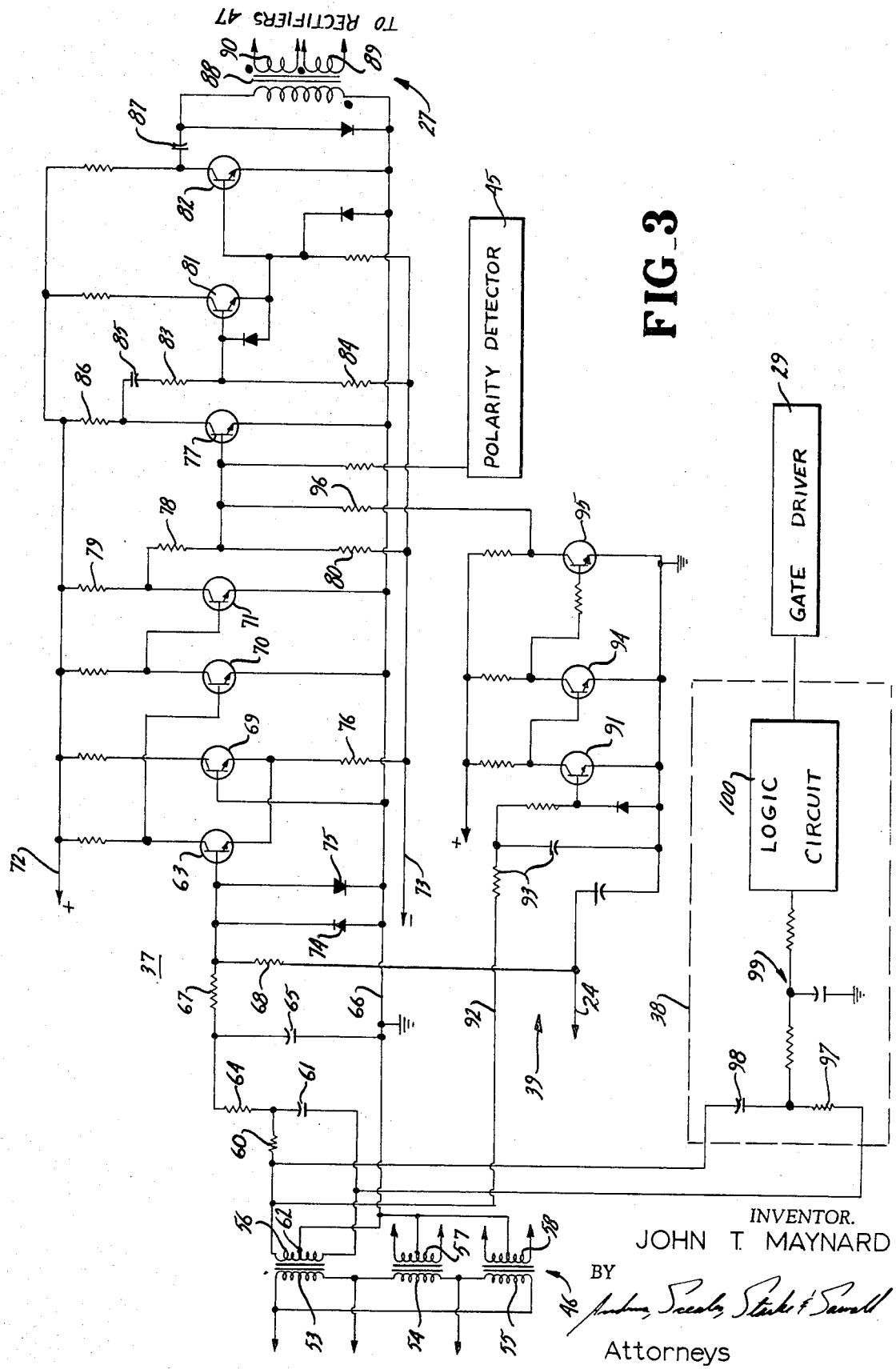
FIG_3

3,668,493

DYNAMOELECTRIC CONTROL CIRCUIT

BACKGROUND OF THE INVENTION

Direct current motors and the like are employed in control and drive systems and may include a feedback system to control the input power to the motor and thereby the motor speed or output. A direct current shunt motor is highly desirable where a relatively constant speed is desired with a high starting torque; for example, where fairly heavy loads are encountered. The shunt motor may conveniently have fixed field excitation and an armature current control providing the desired speed and torque output.

The torque or speed of a shunt motor can be controlled by changing the voltage applied to the field, the voltage applied to the armature or both. The voltage supplied to the armature may be conveniently controlled with the recently developed solid state devices, such as silicon controlled rectifiers of either the unilateral or bilateral conduction variety, both of which allow effective varying of the connection of a polyphase voltage supply to the armature.

One of the severe problems encountered in motor controls, however, is the provision of a truly linear control and one which permits operation of the motor automatically in either a motoring mode or a regenerating mode. Thus, a direct current motor, when being driven by a load, functions as a generator and it is highly desirable to permit regenerating operation of the motor whereby the electrical power generated is fed back into the supply lines.

With the development of the silicon controlled rectifier and other gated electronic solid state switches, a great plurality of motor control circuits have been suggested to selectively control the power supply connection of an electrical load including the armature winding of shunt motors and the like.

A highly satisfactory analog motor control system is shown in applicant's copending application entitled "Dynamoelectric Control Circuit," which was filed on Mar. 14, 1968, with Ser. No. 713,247, and which is assigned to a common assignee herewith. An analog input signal and an analog feedback signal are summated to provide a summated error signal, as more fully disclosed in such application. The summated error signal is modified in accordance with the counterelectromotive force (CEMF or counter EMF) of the direct current motor to establish a control signal. The summated control signal is interconnected to actuate a gating regulator which, in turn, is interconnected to control the phased firing of a solid state gated rectifier network interconnecting the motor armature to an alternating current source. By proper firing of the gated network, the necessary power is supplied to the motor to maintain predetermined operating conditions.

The gating regulating means is arranged such that in the absence of any error signal, the control signal (which includes the CEMF signal) established the zero crossover point of the applied anode voltage and the intersection of the actual CEMF voltage and the applied main anode voltage. The zero crossover point is that point in time when the applied anode voltage goes from positive to negative for the particular silicon controlled rectifier. In order to obtain load current, the error signal advances the firing of the rectifiers from the zero current crossing point to fire during the positive half cycle.

A gating regulator includes a digital signal generator having a logic circuit energizing or controlling a pulse-forming circuit for each of the gated devices of the bridge networks. The logic circuit includes an intercept detector interconnected into a NOR type logic unit which provides an output during the proper half cycle of the applied voltage and further transmits a signal in accordance with the desired phase angle. A zero current detector and intercept detector provide logic signals which limit the effective firing of the rectifiers to an operative period which corresponds to the period the anode of the rectifier is positive. The intercept detector is connected to the summated control signal and provides a logic signal to determine precisely within such operative period when the rectifiers are fired.

A highly accurate and linear control is obtained by energizing of the intercept detector from an A.C. reference voltage related to the rectifier voltage and particularly phase shifted with respect to the voltage applied to the rectifiers by 30°, as more fully desclosed in applicant's previously identified application. In order to provide proper synchronized firing, an internal direct current bias circuit compensates for the initial phase displacement and effectively establishes a zero current firing signal in synchronism with the zero crossover point (at CEMF = 0) of the main applied rectifier voltage. In such a commercial control circuit, the reference voltage was taken from a preceding phase voltage and applied to a lag filter to establish a desired thirty degree leading voltage. This circuit provided a highly satisfactory response as long as all phase voltages were of the same voltage amplitude. However, any difference between phase voltages could result in an error in the firing angle.

SUMMARY OF THE INVENTION

This invention relates to such a dynamoelectric control circuit and particularly to the gating control circuit for establishing a reference phase voltage in precise phase relation to the voltage applied to a gated conductor or switch means such as a controlled rectifier means and estsblishing firing for motoring or regenerating loads.

Generally, in accordance with the present invention, a reference transformer includes an output winding connected to establish voltages in phase with the power voltages to the controlled rectifiers. A series-connected, resistor-capacitor network is connected in parallel with the transformer output winding. The gating reference signal is taken from the central point of the output winding and the resistor-capacitor network to establish an output voltage of useful amplitude while using components of a practical size and power capability. This output voltage is related to the power voltage by a 60° phase shift, but the amplitude of which is essentially directly proportional to the phase voltage being applied to the corresponding controlled rectifiers. Depending upon the logic employed, the output voltage of the transformer is of the same phase or of the inverse phase with respect to the power phase voltage, and the capacitor-resistor network establishes a 60° lead of such output voltage. The output signal is applied to a 30° lag filter to reduce the phase shift angle to 30°. This latter output signal is applied to a transistor logic circuit to establish gating pulses related to the intercept of a control signal with such signal.

The present invention has been found to further improve the linear response characteristic, i.e., the characteristic between the command signal and the power supplied to the motor and, in particular, maintains an essentially straight line or linear characteristic in the continuous current conduction mode. This results in further stability and proper operation in the high current region of the motor circuit or the like with full output in the presence of the counterelectromotive force.

The present invention thus improves the solid state control for a shunt motor and the like with a control which can meet close control tolerances and with a linear and sensitive response.

BRIEF DESCRIPTION OF THE DRAWINGS

The drawings furnished herewith illustrate a preferred construction of the present invention in which the above advantages and features are clearly disclosed as well as others which will be clear from the following description.

In the drawings:

FIG. 1 is a block diagram of a motor control circuit constructed in accordance with the present invention;

FIG. 2 is a graphical illustration of a rectifier anode voltage and a typical firing control voltage trace; and FIG. 3 is a schematic circuit diagram of a preferred construction in accordance with the present invention.

Referring to the drawings and particularly to FIG. 1, the present invention, as illustrated, is applied to control the speed of a direct current shunt motor 1 of any well-known construction and generally in accordance with the teaching of applicant's previously identified copending application. The illustrated shunt motor 1 is diagrammatically shown including a field 2 connected to a fixed excitation source 3. An armature 4 is rotatably mounted within the field 2 and is connected to a direct current power supply circuit 5 which includes a pair of gated rectifier bridge networks 6 and 7 to selectively provide forward and reverse current to the armature 4. The input sides of the bridge networks 6 and 7 are connected in parallel to three-phase power source lines 8 which may, for example, be the widely-employed industrial 460 volt alternating current. The bridge networks 6 and 7 include similar gated devices, such as silicon controlled rectifiers 7a or the like, connected in the known three-phase full wave bridge circuits having pulse signals applied to the gates of related conducting pairs of rectifiers 7 to vary the applied voltage and the magnitude of the corresponding armature current. Bridge network 6 establishes a given directional flow with the resulting torque providing a motoring action in one direction or, if the motor is overdriven and functioning as a generator, a braking or regenerating action. Bridge network 7 establishes the opposite directional current with a corresponding motoring or regenerating action. A digital gating regulator 9, forming a part of a control or regulating circuit 10, is interconnected to the bridge networks 6 and 7 to selectively control the firing and conductivity thereof. A command signal unit 11 provides a direct current input voltage proportional to the desired energization of the motor 1. The output of unit 11 is interconnected to a voltage feedback signal line 12 and a current feedback signal line 13 to control the gating regulator 9 and thereby the armature current.

Generally, three-phase bridge input lines 14 are parallel-connected to the bridge networks 6 and 7 and to the power supply lines 8. A commutation and oscillation filter network 16 is connected to the input side of the bridge networks 6 and 7. Inductors 17 may be connected one in each of the phase lines between the network 16 and the input lines 14. A current sensing network 18 connects the output of network 16 to the current feedback line 13 to provide a signal proportional to the armature current.

The control circuit 10 includes a high gain error amplifier 19 which, in the illustrated embodiment, may be any suitable inverting operational amplifying circuit having a pair of inputs, one of which is connected to the command signal unit 11 and the other of which is connected to the voltage feedback line 12. The output of the error amplifier 19 is proportional to the difference in the command signal and the voltage feedback signal multiplied by the gain of the error amplifier 19.

A voltage isolating and filtering circuit 20 is connected to the circuit of the motor armature 4 and provides an isolated D.C. signal proportional to the armature voltage. The feedback signal is also scaled by the circuit 20 in accordance with the command signal range. Thus, for example, the voltage applied to the D.C. motor may be of the order of 500 volts D.C. whereas the command signal and the associated feedback signal may be of the order of plus or minus 10 volts D.C.

The amplified output signal of the error amplifier is connected via an output line 21 to the input of a multiple input summing amplifier 22.

The summing amplifier 22 is a suitable operational amplifier adapted to algebraically summate a plurality of D.C. signals and may have a gain in the order of unity. A second input of the summing amplifier 22 is connected to the current feedback line 13 and a third input is connected to the voltage feedback line 12 to establish a net input proportional to the counterelectromotive force of the armature. A D.C. bias line 23 inserts an initial D.C. signal level for proper phasing of regulator 9, as hereinafter described. The output of the summing amplifier 22 equals the summated error signal superimposed on the bias level. The summated error signal includes the counterelectromotive force voltage signal $V_g$ and the error signal voltage $B V$ and may be conveniently written $(\pm V_g \pm B\Delta V)$ where $V_g = V_a - IR$ or the armature voltage less the armature resistance drop. The amplifier 22 is interconnected to the digital gating regulator 9 with a reference input from a reference transformer 24 to control the firing of the firing of the bridge networks 6 and 7.

The digital gating regulator 9 provides a zero current firing or $V_g$ tracking system and generally includes six similar gate boards or circuits 25, each of which is similarly constructed to provide a pair of output signals. As each of the gate boards 25 is similarly constructed, only one is shown with detailed block diagram in FIG. 1. The output of circuit 25 includes a forward bridge gate disable/enable line 6 interconnected to a gate driver 27 for controlling selected gated rectifier elements of the bridge network 6 and a second or reverse bridge gate disable/enable line 28 is similarly interconnected to a gate driver 29 for the network 7.

As more fully described in applicant's copending application, the system automatically selects and energizes the proper bridge network 6 or 7 for motoring or regenerating mode of operation in response to the incoming command signal and the closed loop armature voltage feedback signal into the error amplifier 19. The firing in the absence of an error signal and a counterelectromotive force signal is at the zero crossover point of the anode reference voltage wave form corresponding to the voltage applied to the controlled rectifier, as shown at 30 in FIG. 2. The firing signal is established by a phase-shifted and inverted control signal 31 as shown in FIG. 2 to establish the proper polarity of the control signal as applied to the logic circuit of FIG. 3. The control signal is phase-shifted 30° with respect to the actual anode voltage and thereby establishes maximum signal at the 60 point of the anode voltage. An offset direct current bias signal, shown by trace 32, effectively shifts the intercept point to coincide with the initial ($V_g = O$) zero crossover point of the actual anode voltage.

With the motor operating at rated line voltage, the armature generates a rated counterelectromotive force or voltage which is shown at 33 in FIG. 2 superimposed on the incoming line voltage trace applied to the anode of a controlled rectifier of the networks 6 and 7. A related feedback voltage signal sealed to the control signal level is summated with the D.C. bias level signal 32 as shown by signal line 34 and defines a new intercept line with the reference voltage trace 31, with the intercept in synchronism with the intercept of the actual CEMF voltage and the anode voltage as shown by traces 30 and 33 of FIG. 2. This establishes a corresponding zero current firing point. When fired at this point, the output of the controlled rectifier network will be zero. In order to obtain a load current from the bridge network 6, the gate firing must be advanced in time ahead of the zero current firing point. The degree of advance for load current is controlled by the error signal 35 appearing at line 21 of FIG. 1, which is superimposed upon the summated D.C. bias level and the counter EMF level signals to establish the final control intercept line with respect to the control voltage trace 31 as shown in FIG. 2. This then advances the firing point from the intercept of the CEMF voltage with the anode voltage trace 30 and conduction is established until slightly after such intercept point to allow turnoff of the gated rectifier, as shown by the dashed conduction area 36.

The digital gating regulator 9 is a logic circuit establishing the above operation in response to the input signals and includes a pair of intercept detectors 37 and 38, one for each bridge network 6 and 7, and a common zero detector 39. NOR circuits 40 and 41 are connected to the intercept detectors 37 and 38 and to the zero detector 39 to drive the appropriate networks. The NOR circuits 40 and 41 are connected to trigger monostable function circuits 42 and 43 or the like which, in turn, actuate the gate drivers 27 and 29.

The intercept detector 37 functions to summate the A.C. signal voltage with the output of the summing amplifier 22, which sets the D.C. intercept level and thereby establishes a digital output signal in phase with and at a particular firing point in the positive voltage applied to the controlled rectifiers. Maximum conduction for the control rectifiers in the motoring is at the 60° phase angle. Prior thereto, the three-phase voltages which overlap would prevent conduction. The rectifiers can continue to conduct for the balance of the positive half cycle for motoring. In addition, the rectifiers are permitted to conduct during the first 60° of the negative half cycle for regeneration.

Polarity detectors 44 and 45 are connected to the NOR circuits 40 and 41 to selectively enable the channels for motoring and regeneration. The circuits may be of any suitable construction, as more fully described in applicant's copending application, and no further description thereof is given. The zero detector circuit 39 includes a 60° lag filter and is connected to an anode voltage reference transformer 46, and limits the proper gate pulse firing range for maximum gate signal advance when motoring, and the maximum retard when regenerating, as also described in the copending application.

The intercept detector modules 37 and 38 are further logic circuits having one input interconnected to a reference voltage from the anode voltage reference transformer 46 in a circuit which particularly forms the subject matter of the present invention, and a second input connected to the signal line 24 to receive the summated signals of the D.C. bias signal, the counter EMF signal and the error signal, as previously described.

In accordance with the present invention, each of the firing channels is energized from the same phase voltage as that applied to the corresponding controlled rectifier. For purposes of explanation, reference is made to network 6. The illustrated three-phase bridge rectifier network 6 includes three pairs of controlled rectifiers 47, 48 and 49, one pair for each phase. If desired, one controlled rectifier of each pair may be a diode rather than a gated switch means. The appropriate pair must be simultaneously turned on to conduct a corresponding phase. For example, rectifiers 47 must be simultaneously fired to conduct the one or first phase voltage from phase line terminals 50 and 51. The other two phases appear across terminals 50 and 52 and at terminals 52 and 51 and are applied to the corresponding rectifier pairs 48 and 49.

A preferred construction of the reference transformer connection and a preferred logic circuit employing NPN transistors is shown in FIG. 3. The NPN transistors require that the reference voltage be phase-shifted effectively 180° to provide the proper polarity signal for proper firing of the controlled rectifiers.

The input voltage is thus selected to be the inverse of the corresponding phase voltage for each phase of the three-phase input appearing at terminals 50, 51 and 52. Thus, the voltage from terminal 51 to terminal 50 is applied as the input to the intercept detector 37 for controlling the conduction of the rectifiers 47 for the phase voltage from terminal 50 to terminal 51.

Applicant has found a particularly novel and satisfactory phase-sensing system which essentially eliminates the effects of transient voltage while maintaining accurate and reliable gate pulse generation.

As shown in FIG. 3, the reference voltage transformer 46 is a three-phase transformer having three primary windings 53, 54 and 55 connected in delta, and three individual secondary windings 56, 57 and 58 providing phase-related output voltages. The delta-connected primary windings are connected to the output of the three phase supply 15 in parallel with the bridge networks 6 and 7 via lines 59, as shown in FIG. 1, such that winding 53 corresponds to phase lines 50-51, winding 54 corresponds to phase lines 51-52 and winding 55 corresponds to phase lines 52-51. The secondary windings 56, 57 and 58 are wound to invert the phase and thus provide a phase voltage properly related for the control, as shown in FIG. 2. In Fig. 3, the gating circuit for the firing of rectifiers 47 from winding 56 is shown and described in detail. The other windings 57 and 58 are connected to similar circuit for controlling the firing of the rectifier pairs 48 and 49.

A phase shift network consisting of a resistor 60 in series with a capacitor 61 is connected across the secondary 56. The reference signal is taken between a center tap 62 on the winding 56 and the common junction of the resistor 60 and capacitor 61. The phase of the voltage varies with the value of resistor 60 but the amplitude of the voltage is essentially constant for all phase settings and is directly proportional to the actual phase voltage applied to rectifiers 47. In accordance with the present invention, the resistor 60 establishes an output voltage which leads the actual applied or related inverted voltage by 60°. Although magnetic firing circuits generally employ a variable resistor or the like to permit tuning of the circuit due to the wide tolerance of magnetic material, the present circuit may employ standard precision components and the usual tolerances of fixed value. Although the 60° phase shift is a greater lead than required for the proper phase voltage, applicant has found that the 60° lead, in combination with a following 30° lag filter, provides transient protection which is not obtained with a 30° lead filter only. To obtain the desired 30° signal of FIG. 2, a 30° lag filter circuit connects the output of the lead filter to the input or base of an input transistor 63 of the regulator.

The lag filter circuit includes a resistor 64 in series with a capacitor 65 connected between the junction of the lead filter and a common logic line 66 connected to tap 62 of the reference transformer 46. The resistor 64 and capacitor 65 establish a 30° lag filter, thereby changing the reference voltage from a 60° lead to a 30° lead, as shown in FIG. 2. A resistor 67 connects the junction of resistor 64 and the capacitor 65 to transistor 63 to impress the 30° lead voltage or signal 31 of FIG. 2 to the gating regulator 9.

A resistor 68 connects the output of the summing amplifier 22 via the line 24 as a second input to the transistor 63.

In the absence of a summated error signal and/or a CEMF signal, the gating regulator 9 establishes a firing pulse in synchronism with the zero crossover point corresponding to zero firing angle. The summated voltage, including the error signal and armature compensation signal, provides a continuous control signal which intercepts with the phase-shifted control signal to change the bias of transistor 63 and advance of the firing angle under motoring conditions.

Applicant has found that this particular input circuit essentially eliminates any problem with transient sensing voltages.

The previous phase of a three-phase supply is, of course, shifted by 60° and in combination with a lag filter, provides the desired 30° phase shift. However, this requires that the phase voltages have a corresponding amplitude in order to maintain proper triggering as the triggering is dependent upon the intercept of the reference voltage with the summated D.C. control voltage. Applicant has found that the sensing of the desired phase or line voltage through the voltage-dividing network which establishes a 60° lead signal of constant amplitude in combination with the filter network, provides a reliable and improved circuit with automatic phase voltage compensation.

Further, applicant has found that in the continuous or high current region, which normally occurs above a 30° advance from the zero firing point, automatic line voltage compensation is obtained. If the anode voltage increases, the gate firing circuit is inherently retarded, at least above 30° advance. Under motoring conditions, a relative low current is established below 30° advance and a high current only exists after an advance of 30°. The latter region is, therefore, of primary interest and automatic line voltage compensation has been determined to positively exist in this region.

Transistors 63 and 69 are connected in a common emitter circuit differential amplifier configuration with a common emitter resistor 76 connected to the negative supply line 73. The base of transistor 69 is connected to the logic common line 66 and establishes a reference current through resistor 76. The output element or collector of transistor 63 is connected to the base of transistor 70 which, in turn, is connected to drive the transistor 71. The transistors 70 and 71 function as cascaded inverters to establish an operating logic signal at the collector of transistor 71, which is connected to actuate the NOR logic unit 41.

The NOR logic unit 41 is shown as an NPN transistor 77 and has the base connected in series with a resistor 78 to the collector of transistor 71. A bias network is provided including a resistor 79 connecting the collector of transistor 71 to the positive power supply and a bias resistor 80 connecting the base of transistor 77 to the negative supply line 73. Resistors 79, 78 and 80 define a voltage dividing network biasing transistor 77 to conduct. When transistor 71 conducts, however, junction of resistors 78 and 79 is connected to logic zero which is at ground and the NOR transistor 77 is driven off.

The zero detector 39 is also connected to the base resistor of transistor 77 and is operative as hereinafter described to alternately inhibit and permit to fire transistor 77 in response to the alternating A.C. input-to-zero detector 39. The NOR transistor 77 is further connected to the polarity detector 45 which permits firing only in response to an appropriate negative error signal from the error amplifier 19. Thus, transistor 77 conducts only when the outputs of detector 37, detector 39 and negative polarity detector 44 are on and at logic O, and thus functions as a NOR logic unit.

The detector transistor 77 is responsive to the intercept of the alternating current reference signal 31 with the existing D.C. level supplied from the summing amplifier 22 via line 24 and resistor 68.

The various input resistors to the summing point at the input of transistor 63 are selected to convert the signal voltages into related individual currents such that the current at the base of transistor 63 is the sum of the individual currents flowing through the two resistive paths.

As the total gain of the transistors 63, 70 and 71 is substantial, and a very small summated current at the base of transistor 63 results in driving of the output transistor 71 into saturation, thereby driving its collector and the common connection of resistors 78 and 79 to ground, corresponding to a logic O level, and turning transistor 77 off. The output of NOR transistor 77 is coupled to the output switch unit 43 which is shown as a pair of transistors 81 and 82 connected in a Darlington circuit pair to produce a rapid acting switch. The input circuit to the transistor 81 of the Darlington circuit includes a pair of resistors 83 and 84 connected in series with a capacitor 85 to collector of transistor 77 and to the positive supply line 72 in series with the collector resistor 86 of transistor 77. The transistor 77 is thus effective in discharging the capacitor 85 to ground and turn off the Darlington circuit.

When the NOR transistor 77 turns off, the transistor 81 is momentarily energized until capacitor 85 charges. This drives the transistor 82 to conduct heavily and produce an output firing signal to the pulse driver 27. For example, transistor 82 may be connected as a switch to discharge a capacitor 87 through a pulse transformer 88 having a pair of secondaries 89 and 90 connected to fire the appropriate rectifiers 47 of network 6.

A schematic of zero detector module 39 is also shown in FIG. 3. The illustrated circuit includes an input transistor 91 having an input circuit connected to the alternating current reference source via line 92 through a resistor-capacitor network 93. An amplifying transistor 94 connects the input transistor 91 to drive an output transistor 95 which is connected to the input of the transistor 77 via a coupling resistor 96.

The zero detector 40 thus further insures that the channel to fire rectifiers 47 are fired only during the appropriate half-cycle of the voltage on the rectifiers 47 of the bridge network 6.

A similar control channel is defined by detector 38 for the corresponding rectifier 47 of network 7 is provided and driven from the corresponding phased secondary 56 of the reference transformer 46. The control channel is shown in block diagram, except for the input circuit which is essentially the only change in the internal circuit construction.

The lead filter network for the second detector 38 includes a resistor 97 and a capacitor 98 connected in series with each other and in parallel with the secondary 56. The connection of resistor 97 and capacitor 98 is opposite that of the resistor 60 and capacitor 61 to produce a 60° lead with respect to the voltage from terminal 51 to terminal 50 and thus the direct opposite of that for detector 37. The junction of capacitor 98 and resistor 97 is connected to a lag filter 99 which drives a logic circuit 100 and thereby the gate driver. The output of the detector 38 is thus connected to drive the network 7 to permit the regeneration mode in response to the corresponding intercept and actuation of the NOR circuit 40 from the positive polarity detector 44.

The output of the several other gating regulator boards for the rectifiers 48 and 49 are interconnected to control the firing of the bridge networks 6 and 7. The present invention has been found to establish a reliable and accurate firing control with the firing providing an automatic line voltage change compensation within the high current output region.

Various modes of carrying out the invention are contemplated as being within the scope of the following claims, particularly pointing out and distinctly claiming the subject matter which is regarded as the invention.

I claim:

1. A polyphase motor control circuit for energizing of a D.C. motor from a polyphase power supply to maintain a regulated motor output, comprising signal-forming means establishing a first control signal related to the actual motor output and a desired output, individual gated control means for each of the phase voltages of said polyphase power supply, said gated control means being connected to the motor and having a gate means for controlling actuation of the gated control means and the input power connection of said motor to the incoming power supply, a gate pulse regulating circuit including a separate control channel for each of said phase-related gated control means, said pulse regulating circuit including a reference transformer means connected to said power supply and having phase-related output windings establishing voltages corresponding to the voltages applied to said gated control means, each of said separate channels including resistive-capacitive branch circuit means connected in parallel with the corresponding phase of said transformer and defining a lead filter network, each channel having a reference means connected to said signal-forming means and having a lag filter network connected to the branch circuit means and to the corresponding transformer to establish a phase-related alternating current reference signal of a preselected phase shift with respect to the corresponding gated control means phase voltage, each channel including a signal-shaping means connected to the reference means to generate a gating signal, and connecting means to connect the gating signal to the corresponding gate means.

2. The motor control circuit of claim 1, wherein said reference transformer includes a common primary and a plurality of individual phase-related secondary winding means having a center tap, and said lag filter network is connected between the center tap and an intermediate connection of the lead filter network.

3. The motor control circuit of claim 1, wherein said reference transformer includes a delta-connected primary and a plurality of individual phase-related secondary windings, each of said branch circuits includes a resistor in series with a capacitor connected across a corresponding phase secondary winding to produce a signal proportional to the corresponding line-to-line voltage, and said lag filter network is connected between the junction of the resistor and capacitor of the lead filter and a center point of the corresponding phase secondary winding.

4. The motor control circuit of claim 1, wherein said reference transformer includes a plurality of individual phase-related secondary windings, each of said branch circuits includes a resistor in series with a capacitor connected across a corresponding phase secondary winding to produce an alternating current signal proportional to the corresponding line-to-line voltage and leading the line-to-line voltage by 60°, said lag filter network includes a resistor in series with a capacitor connected between the junction of the resistor and capacitor of the lead filter and a center point of the corresponding phase secondary winding to establish a reference voltage leading the line-to-line voltage by 30°, and means connected to the reference means to operatively shift the reference voltage 30° to establish synchronism with the line-to-line voltage applied to the gated switch means of the rectifying means.

5. The polyphase motor control circuit of claim 1 wherein said signal forming means establishes a direct current control signal, said reference means including an input amplifier stage including an input connected to said signal-forming means and to said lag filter network, said amplifier stage conducting in response to the intercept of the direct current signal with the alternating current reference signal, each of said lead filter networks establishing a 60° phase shift, each of said lag filter networks establishing a 30° phase shift and a direct current bias signal source means connected to the amplifier to establish a reference intersection with said alternating current reference signal in synchronism with the zero crossover of the corresponding phase voltage.

6. The motor control circuit of claim 1, wherein said reference transformer includes a plurality of individual phase-related secondary windings having a center point connection, said lead filter network includes a resistor in series with a capacitor and said lag filter network includes a capacitor in series with a resistor connected between the center point connection and the connection of the resistor and capacitor of the lead filter network, and said reference means includes a logic amplifier having an input connected to said signal-forming means and across the capacitor of the lag filter network.

7. The motor control circuit of claim 1, wherein said gated control means includes a pair of oppositely polarized gated control elements for each phase voltage, said reference transformer includes a plurality of individual phase-related secondary windings, each of said branch circuits includes a first resistor in series with a first capacitor connected across a corresponding phase secondary winding to produce a first leading reference signal proportional to the corresponding line-to-line voltage at the junction of the resistor and capacitor, each of said branch circuits including a second resistor in series with a second capacitor oppositely connected in parallel with the corresponding phase secondary winding to produce a second leading reference signal, first and second lag filter means in said lag filter network connected between the junction of the corresponding resistor and corresponding capacitor and to a common point of the corresponding phase secondary winding, said reference means including a first detector and a second detector connected to the corresponding first and second lag filter means and to the signal-forming means, said signal-shaping means including a pair of means connected one each to the detectors to define a first gating signal and a second gating signal, and said connecting means connecting the gating signals to the corresponding phase-related gated control means for each phase.

8. The motor control circuit of claim 1 wherein said gated control means includes a pair of oppositely polarized gated rectifiers for each phase voltage, each of said branch circuits includes a first resistor in series with a first capacitor connected across a corresponding phase secondary winding to produce a first leading reference signal proportional to the corresponding line-to-line voltage at the junction of the resistor and capacitor, each of said branch circuits including a second resistor in series with a second capacitor oppositely connected in parallel with the corresponding phase secondary winding to produce a second leading reference signal, first and second lag filter means in said lag filter network, each lag filter means including a resistor in series with the capacitor and connected between the junction of the corresponding resistor and capacitor of the corresponding lead filter and to a center tap of the corresponding phase secondary winding, and said reference means includes a first and a second logic amplifier connected to said signal-forming means, said first logic amplifier being connected across the capacitor of the first lag filter means and said second logic amplifier being connected across the second lag filter means.

* * * * *